United States Patent
Pollock

(10) Patent No.: US 11,894,724 B2
(45) Date of Patent: Feb. 6, 2024

(54) ALTERNATOR WITH ROTOR LAMINATION STACK

(71) Applicant: Generac Power Systems, Inc., Waukesha, WI (US)

(72) Inventor: David William Pollock, Milwaukee, WI (US)

(73) Assignee: Generac Power Systems, Inc., Waukesha, WI (US)

(*) Notice: Subject to any disclaimer, the term of this patent is extended or adjusted under 35 U.S.C. 154(b) by 458 days.

(21) Appl. No.: 17/084,298

(22) Filed: Oct. 29, 2020

(65) Prior Publication Data

US 2022/0140671 A1    May 5, 2022

(51) Int. Cl.
| | |
|---|---|
| *H02K 1/24* | (2006.01) |
| *H02K 1/16* | (2006.01) |
| *H02K 7/18* | (2006.01) |
| *H02K 3/28* | (2006.01) |

(52) U.S. Cl.
CPC ........... *H02K 1/24* (2013.01); *H02K 1/165* (2013.01); *H02K 7/1807* (2013.01); *H02K 3/28* (2013.01)

(58) Field of Classification Search
CPC ........ H02K 1/24; H02K 1/165; H02K 7/1807; H02K 3/28; H02K 3/16; H02K 19/22; H02K 2213/03
USPC ...................................................... 310/40 R
See application file for complete search history.

(56) References Cited

U.S. PATENT DOCUMENTS

| | | | | |
|---|---|---|---|---|
| 2,449,506 | A | * 9/1948 | Pollard | H02K 1/24 322/51 |
| 2,679,605 | A | * 5/1954 | Kilgore | H02K 1/265 310/179 |
| 6,046,568 | A | * 4/2000 | Pengov | H02K 19/103 318/400.29 |
| 10,468,929 | B2 | 11/2019 | Biebighauser et al. | |
| 2016/0118851 | A1 | 4/2016 | Biebighauser et al. | |

FOREIGN PATENT DOCUMENTS

| | | |
|---|---|---|
| AT | 352824 B | 10/1979 |
| CA | 2669430 C | 1/1999 |
| JP | 6795143 A | 11/2010 |
| JP | 4792066 B2 | 7/2011 |

OTHER PUBLICATIONS

EP3496236A1 (Year: 2019) Jun. 2019.*
S. Nuzzo et al., Damper Cage Loss Reduction and No-Load Voltage THD Improvements in Salient-Pole Synchronous Generators, 8th IET International Conference on Power Electronics, Machines and Drives (PEMD 2016); 3 pages.
J. H. Walker, M.Sc., PhD., Slot Ripples in Alternator E.M.F. Waves, May 13, 1948, revised on Sep. 14, 1948, pp. 81-92, 12 pages.

* cited by examiner

*Primary Examiner* — Ahmed Elnakib
(74) *Attorney, Agent, or Firm* — Merchant & Gould P.C.

(57) ABSTRACT

A rotor core lamination is provided. The rotor core lamination includes a plurality of salient poles. Each of the salient poles includes: a pole body having a central axis in a radial direction of the rotor core lamination; and a pole shoe extending radially outward from the pole body, wherein the pole shoe has a pole shoe arc, and a central point of the pole shoe arc is offset from the central axis.

14 Claims, 14 Drawing Sheets

Damper rod hole with opening to pole shoe periphery

ALTERNATOR WITH ROTOR LAMINATION STACK

Synchronous alternators are commonly used to produce electrical energy. Synchronous alternators generally have a rotor that is inside a stationary stator having conductive stator windings. Rotating magnetic fields on the spinning rotor create electric voltages in stator windings of the stationary stator. When the alternator is connected to a load, electric current flows in the stator windings. The electric current from the stator windings is output as electric power.

The output voltage of a synchronous alternator contains harmonics from several sources. Harmonic voltages are often detrimental to equipment supplied by a synchronous alternator. Minimizing the harmonic content of output voltage is often a requirement of synchronous alternator design.

A source of harmonic output voltages in synchronous alternators is the variation in magnetic permeability between the openings of stator slots for accommodating stator windings and the steel cores. Harmonic voltages caused by slotting are often referred to as slot harmonic voltages or ripple voltages. In synchronous alternators, stator slotting is often a significant contributor to the harmonic content of output voltage when mitigation techniques are absent.

Therefore, there is a need for synchronous alternators that can achieve reduced harmonic voltages.

SUMMARY

The present disclosure is generally directed to synchronous electrical machines. In certain examples, aspects of the present disclosure relate specifically to synchronous electrical machines with reduced harmonic content of output voltage.

One aspect of the present disclosure relates to a rotor core lamination. The rotor core lamination includes a plurality of salient poles. Each of the salient poles includes: a pole body having a central axis in a radial direction of the rotor core lamination; and a pole shoe extending radially outward from the pole body, wherein the pole shoe has a pole shoe arc, and a central point of the pole shoe arc is offset from the central axis.

Another aspect of the present disclosure relates to a rotor. The rotor includes a lamination stack and main field windings accommodated on the lamination stack. The lamination stack includes a plurality of rotor core laminations. The plurality of rotor core laminations are unskewed. Each of the plurality of rotor core laminations includes a plurality of salient poles. Each of the salient poles includes: a pole body having a central axis in a radial direction of the rotor core lamination; and a pole shoe extending radially outward from the pole body, wherein the pole shoe has a pole shoe arc, and a central point of the pole shoe arc is offset from the central axis.

One aspect of the present disclosure relates to a synchronous electrical machine. The synchronous electrical machine includes: a stator comprising a plurality of stator slots arranged to accommodate stator windings; and a rotor inside the stator. The rotor includes a lamination stack and main field windings accommodated on the lamination stack. The lamination stack includes a plurality of rotor core laminations. The plurality of rotor core laminations are unskewed. Each of the plurality of rotor core laminations includes a plurality of salient poles. Each of the salient poles includes: a pole body having a central axis in a radial direction of the rotor core lamination; and a pole shoe extending radially outward from the pole body, wherein the pole shoe has a pole shoe arc, and a central point of the pole shoe arc is offset from the central axis.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
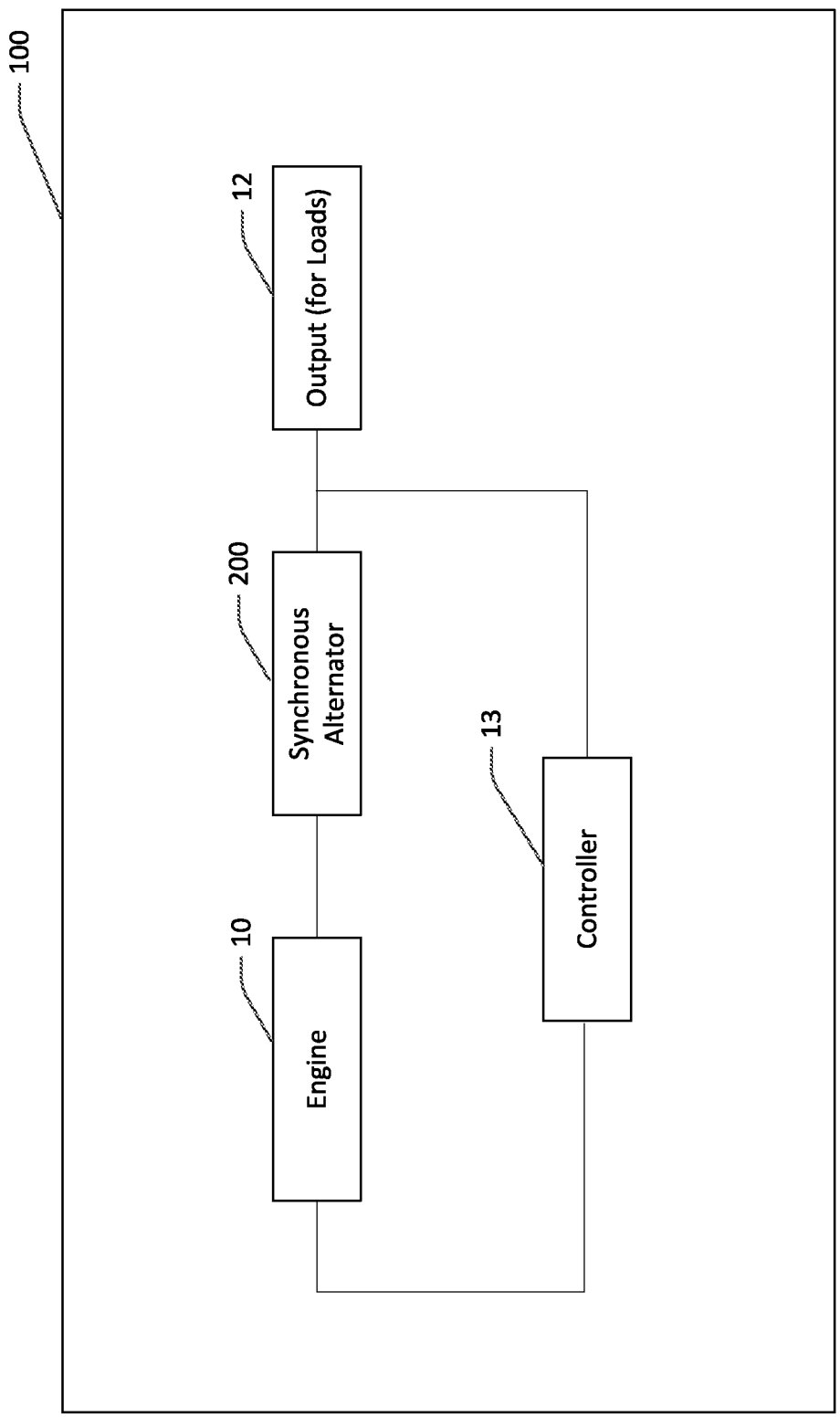
FIG. 1 is a schematic diagram of an electrical generator including a synchronous alternator.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Assumptions

Electrical output is taken from windings located on the stator of an alternator.

Symbols and Operators Used in Explanations

S amount of stator slots per pole pair
$n_o$ speed of rotation of rotor
$f_o$ fundamental frequency of alternator output voltage
k positive integer value other than one
Addition is signified by the operator "+", e.g., the amount of stator slots per pole pair, plus one, is stated as: S+1.
Subtraction is signified by the operator "−", e.g., the amount of stator slots per pole pair, minus one, is stated as: S−1.
Multiplication is signified by the operator "−", e.g., the amount of stator slots per pole pair multiplied by the fundamental frequency, is stated as: S−$f_o$.
Division is signified by the operator "/", e.g., speed of rotation of rotor, divided by the amount of stator slots per pole pair plus one, is stated as: $n_o$/(S+1).

FIG. 1 is a schematic diagram of an electrical generator 100 including a synchronous alternator 200. As shown in FIG. 1, the electrical generator 100 includes, among other things, an engine 10, the synchronous alternator 200, and an output 12. The engine 10, when running, drives the synchronous alternator 200 to produce electrical current that is supplied to the output 12. The output 12 is electrically coupled to an electrical load or multiple electrical loads. In some embodiments, the multiple electrical loads are appliances in a household. In other embodiments, the multiple electrical loads are appliances in a commercial building such as a hospital, a school, an airport, a data center, a telecommunication base station, a factory, a small business, and so on. In some embodiments, the engine 10 is an internal combustion engine, in which the combustion of a fuel occurs with an oxidizer (often air) in a combustion chamber. The expansion of the high-temperature and high-pressure gases produced by the combustion applies force to a rotor (not shown) of the synchronous alternator 200. The rotation of the rotor produces the electrical current. Details of the rotor will be described below with reference to FIGS. 6-8. It should be noted that the electrical generator 100 may further include other components such as a controller 13.

Figure 2:
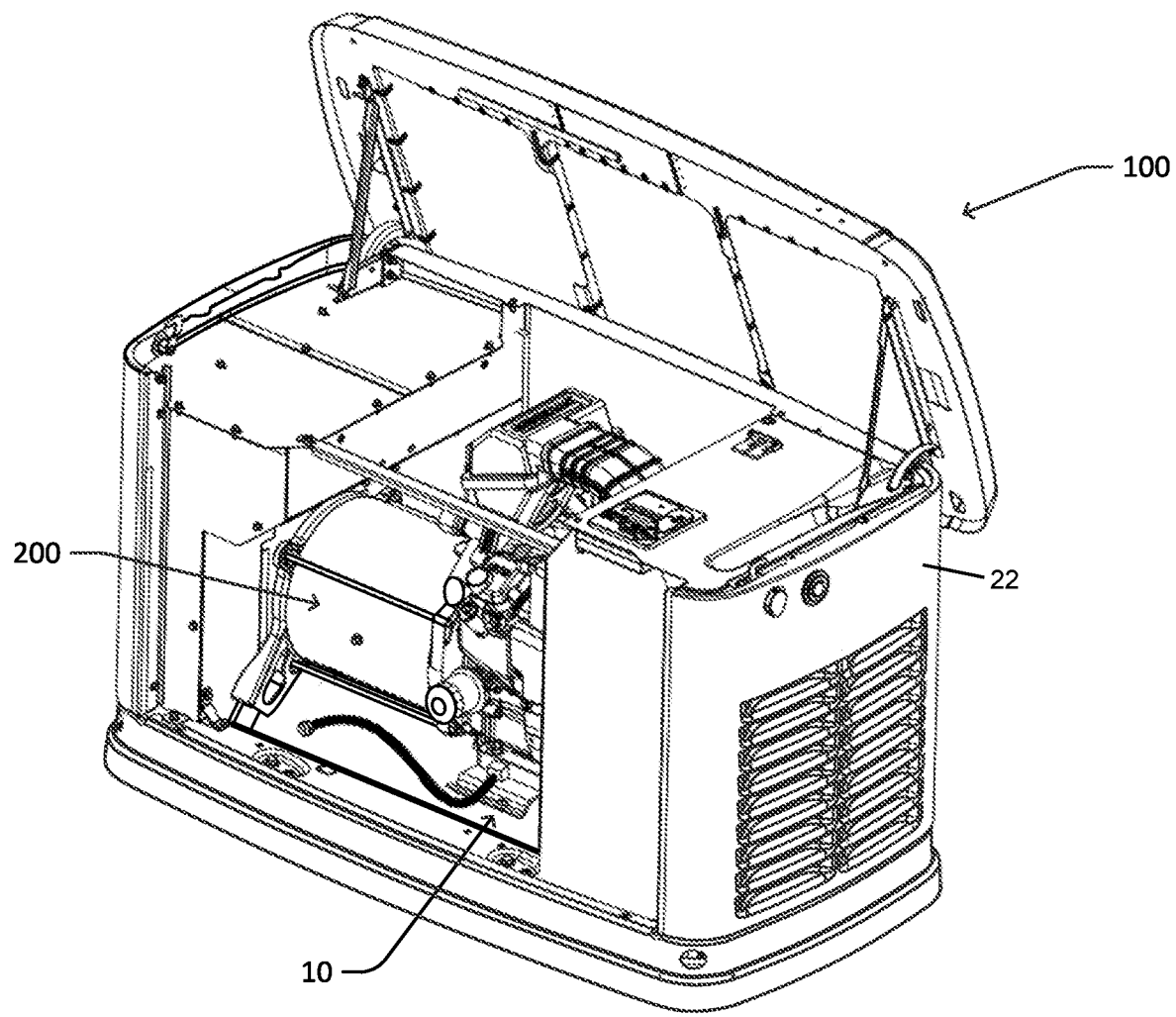
FIG. 2 is a perspective diagram of the electrical generator of FIG. 1.

FIG. 2 is a perspective diagram of the electrical generator 100 of FIG. 1. In the example shown in FIG. 2, the electrical generator 100 includes, among other things, the engine 10, the synchronous alternator 200, and the output (the output 12 shown in FIG. 1), which are accommodated in a housing 22 with a cover along with other components. Fuel is added to the engine 10 through the fuel inlet. In one example, the fuel is gasoline. In another example, the fuel is diesel fuel. In yet another example, the fuel is liquid propane gas (LPG). In a further example, the fuel is natural gas (NG). It should be noted that in some embodiments, the electrical generator 100 may be a duel-fuel electrical generator which can operate by using two fuels (e.g., NG and LPG).

Figure 3:
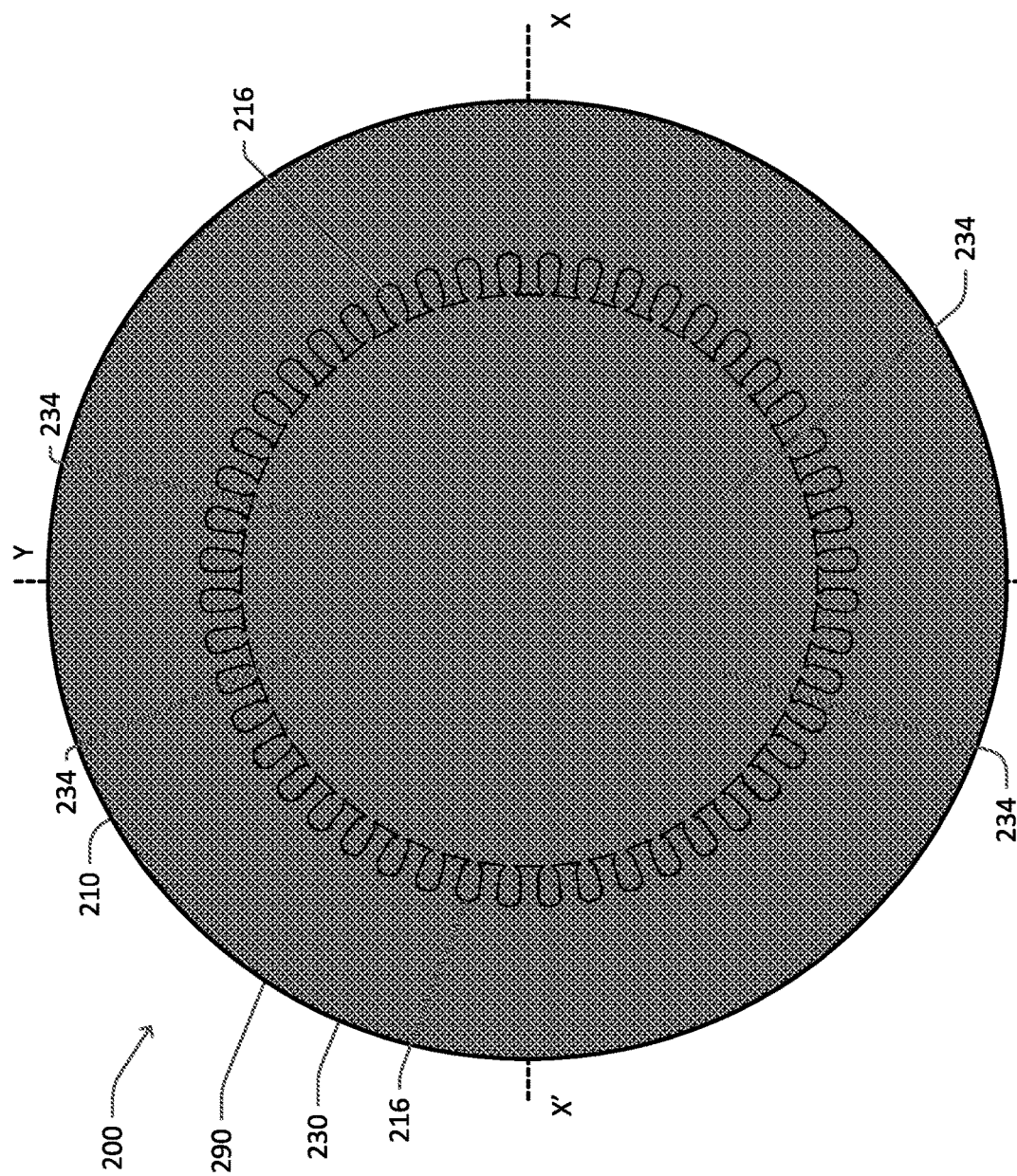
FIG. 3 is an axial cross-sectional diagram of the synchronous alternator of FIGS. 1-2.

FIG. 3 is an axial cross-sectional diagram of the synchronous alternator 200 of FIGS. 1-2. In the example shown in FIG. 3, the synchronous alternator 200 includes, among other things, a stator 210 and a rotor 230. There is an air gap 290 between the stator 210 and the rotor 230. The rotor 230 includes, among other things, a rotor core 232 and multiple main field windings 234. In a non-limiting example, a rotor core is a steel core comprising rotor core laminations. In a non-limiting example, main field windings are coils wound into slots on the rotor core. The rotor 230 is arranged to rotate inside the stator 210. Specifically, the rotor 230 rotates when a rotor shaft, not shown, is driven by the force generated by the engine 10 shown in FIGS. 1-2 as mentioned above. The rotor shaft is accommodated in a shaft aperture 236 of the rotor 230. Details of the stator 210 and the rotor 230 will be described below with reference to FIGS. 4-5 and FIGS. 6-8, respectively.

In operation, an electrical current flowing in main field windings 234 of the rotor 230 causes a magnetic flux to flow across the air gap 290 between the stator 210 and the rotor 230. As the rotor 230 rotates, the magnetic flux rotates as well. The rotating magnetic flux induces a voltage in the stator windings (stator conductors) 216. As such, the synchronous alternator 200 can generate the electrical current to be supplied to the output 12 shown in FIG. 1. It should be noted, the synchronous alternator 200 can be regarded as one use case of a synchronous electrical machine. An electrical machine is a motor or a generator (alternator). The synchronous electrical machine can also be operated as a synchronous motor, where a voltage is applied to the stator windings and the generated magnetic flux causes the rotor 230 to rotate. Therefore, the rotor 230 can be used generally in a synchronous electrical machine, including both a synchronous alternator and a synchronous motor.

Figure 4:
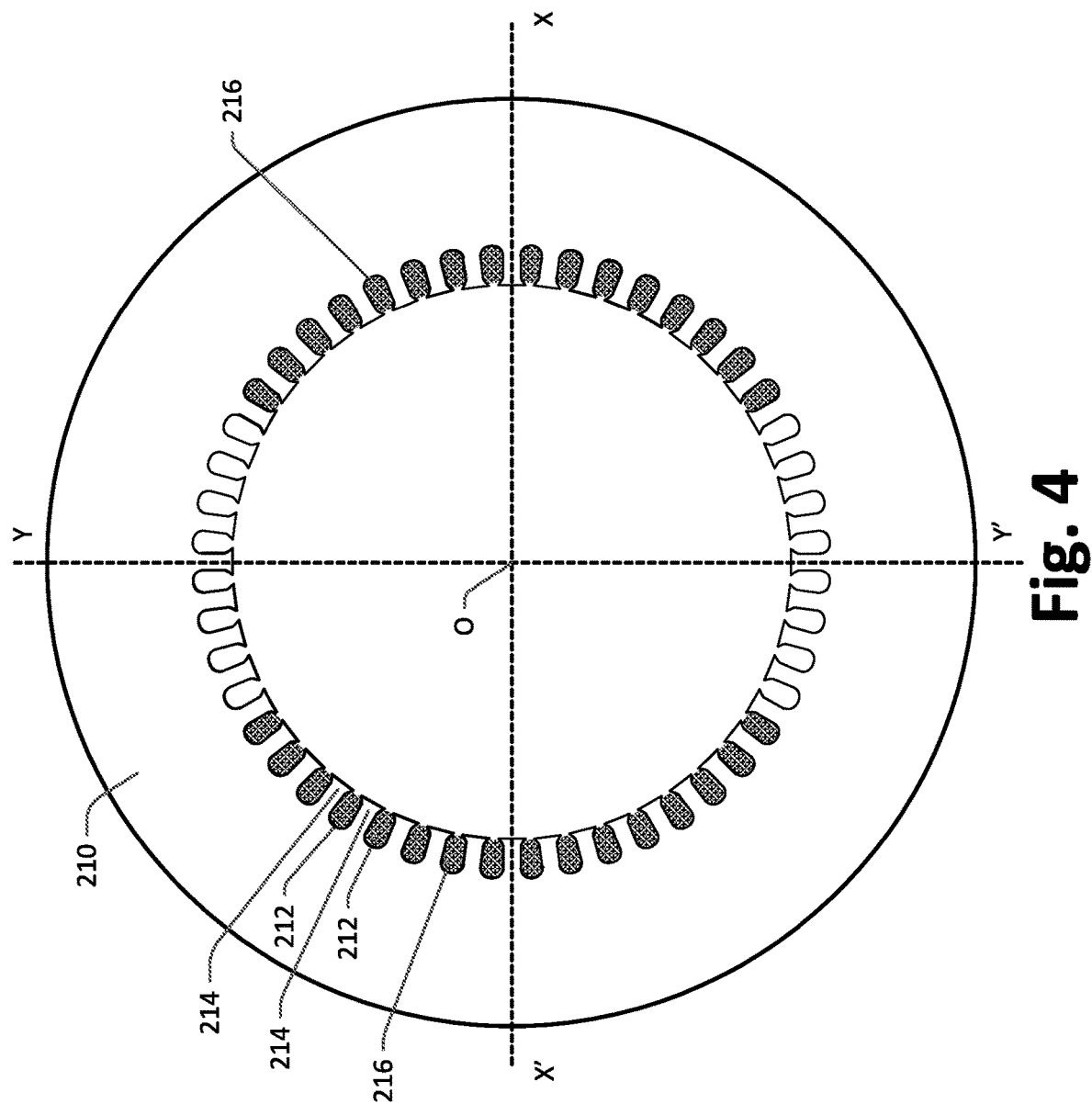
FIG. 4 is an axial cross-sectional diagram of the stator of FIG. 3.
Figure 5:
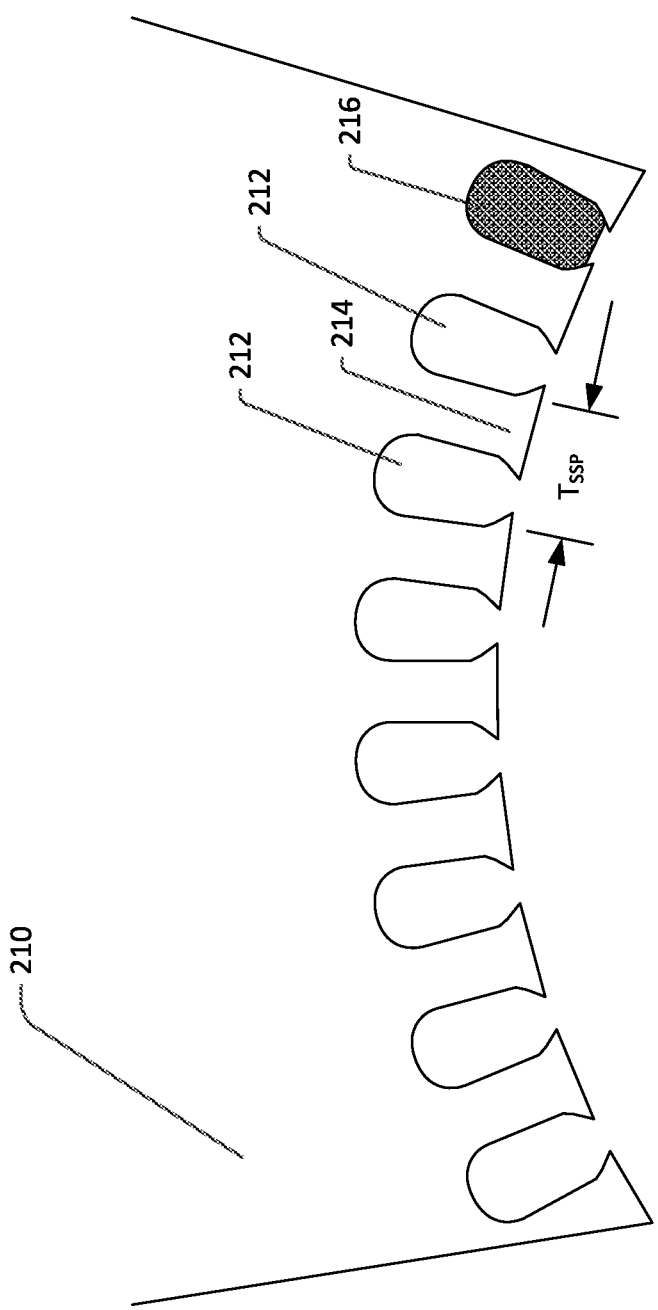
FIG. 5 is an enlarged diagram of a portion of the stator of FIG. 4.

FIG. 4 is an axial cross-sectional diagram of the stator 210 of FIG. 3. FIG. 5 is an enlarged diagram of a portion of the stator 210 of FIG. 4. In the example of FIG. 4, the stator 210 has multiple stator slots 212 formed on the inside of the stator 210. Two neighboring stator slots 212 are separated by one stator tooth 214 protruding radially inward. In the example of FIG. 4, the stator 210 has forty-eight stator slots 212, though other numbers of stator slots 212 are also within the scope of the disclosure. Now referring to FIG. 5, the stator slots 212 accommodate the stator windings 216. In one embodiment, the synchronous alternator 200 is designed to be connected to a three-phase electrical grid, and the stator windings 216 accommodated in the stator slots 212 are also connected in three phases, though other connections are within the scope of the disclosure. The stator slot pitch is a width measured from where one stator slot begins to where the next stator slot begins, i.e., $T_{SSP}$ as shown in FIG. 5.

Figure 6:
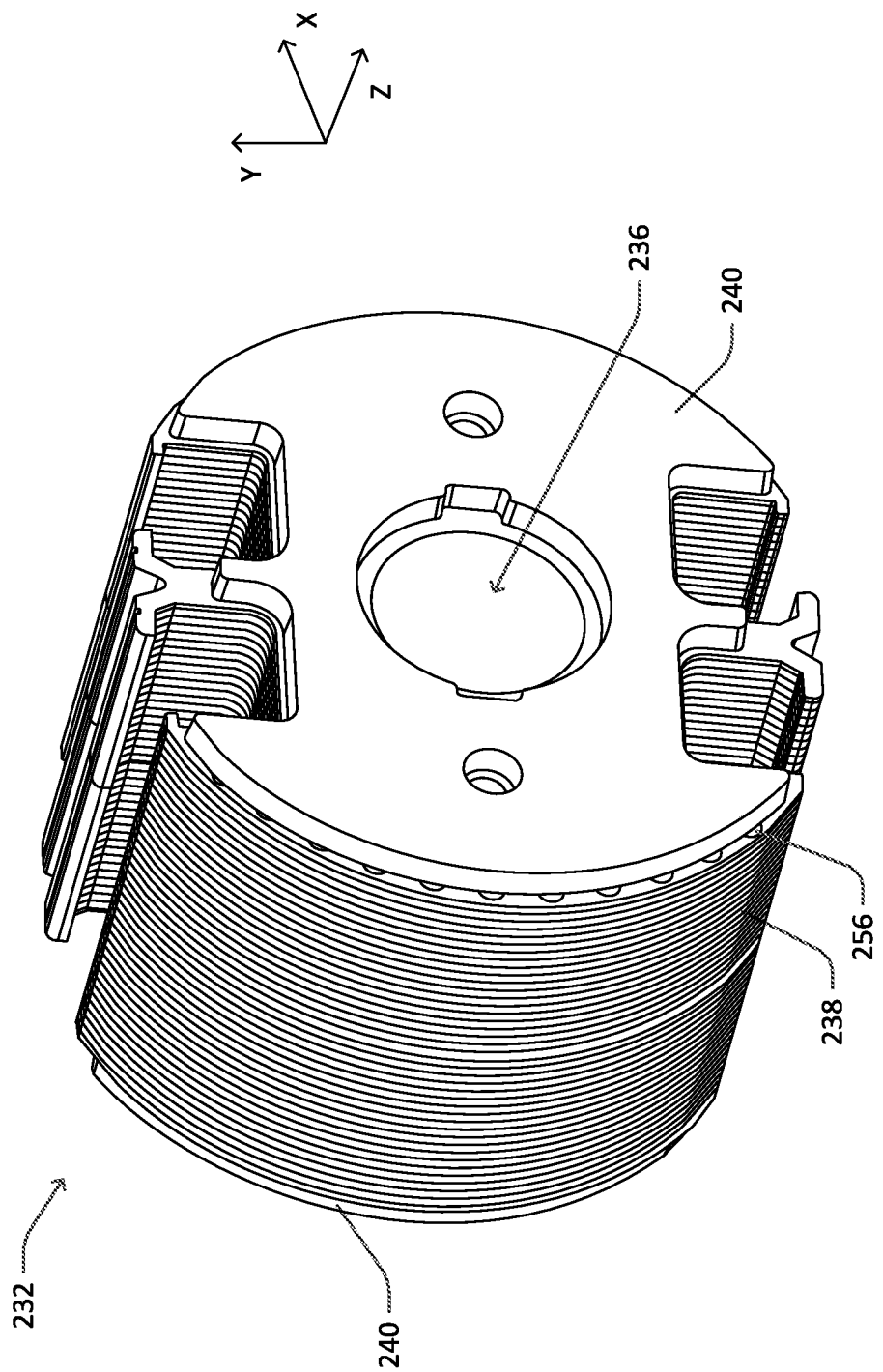
FIG. 6 is a perspective view of the rotor core of the rotor of FIG. 3.

FIG. 6 is a perspective view of the rotor core 232 of the rotor 230 of FIG. 3. In the example shown in FIG. 6, the rotor core 232 includes, among other things, multiple rotor core laminations 238 and two end laminations 240. The rotor core laminations 238 are arranged to form a lamination stack. In one embodiment, the rotor core laminations 238 are stacked. Conducting rods are placed in the damper holes 256, and welded to the end laminations 240. In another embodiment, the rotor cage formed by the conducting rods and end laminations is produced by die casting. In a non-limiting example, a rotor cage is an electrically conducting structure comprising rods or bars placed in holes in a rotor core, connected at each end. A further embodiment employs conducting rings, connected to the conducting rods at each end of the stack, to form the rotor cage. In one embodiment, the rotor core laminations 238 are unskewed, meaning that the cross sections of the rotor core laminations in a X-Y plane shown in FIG. 6 perpendicular to the Z axis (i.e., the rotation axis of the rotor core 232) shown in FIG. 6 are the same, without any displacement (including linear displacement and angular displacement). The two end laminations 240 are located at both sides of the lamination stack in the axial direction (i.e., the Z direction). The multiple rotor core laminations 238 and the two end laminations 240 are aligned, and all of them have the same shaft aperture 236 for accommodating the rotor shaft not shown.

Figure 7:
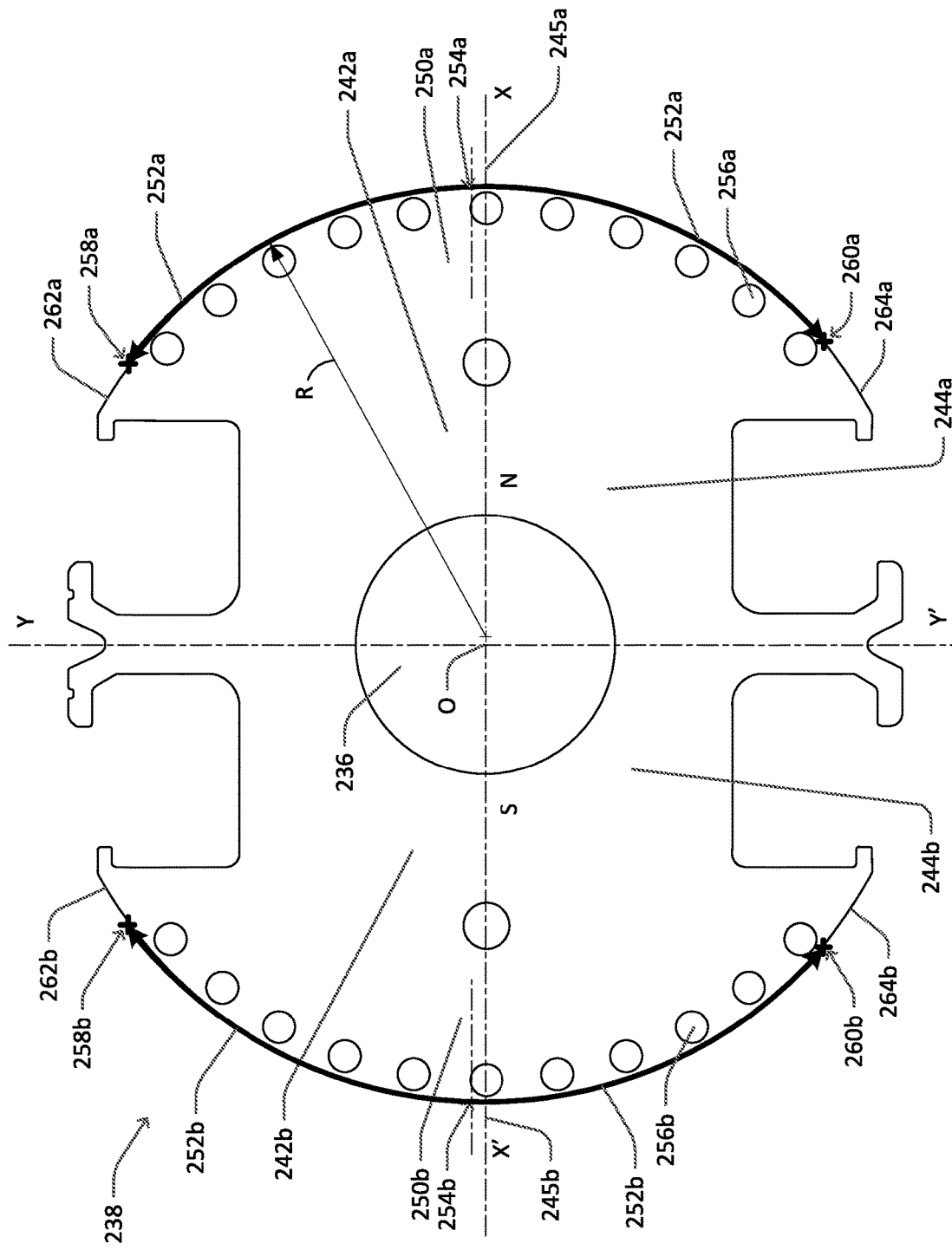
FIG. 7 is an axial cross-sectional diagram of the rotor core lamination of FIG. 6.

FIG. 7 is an axial cross-sectional diagram of the rotor core lamination 238 of FIG. 6. In the example shown in FIG. 7, the rotor core lamination 238 includes, among other things, two salient poles 242a and 242b. The salient pole 242a may be considered a "north" pole while the salient pole 242b may be considered a "south" pole. The salient pole 242a and the salient pole 242b are a pair of salient poles. Current flows through the main field windings, not shown, in the salient pole 242a and the salient pole 242b. As such, the salient pole 242a and the salient pole 242b are alternately magnetized as the "north" pole and the "south" pole, respectively, during operation. It should be noted that various numbers (e.g., four, six, eight) of salient poles may be employed and within the scope of the disclosure.

The rotor core lamination 238 is configured to rotate about a rotation axis, and the rotation axis passes a central point O of the shaft aperture 236. Two lines X-X' and Y-Y' are perpendicular to each other and intersect at the central point O, as shown in FIG. 7. The salient pole 242a and the salient pole 242b are symmetrical about the line Y-Y' shown in FIG. 7. Thus, only the salient pole 242a is described in detail below for simplicity. The salient pole 242a includes, among other things, a pole body 244a and a pole shoe 250a. The pole body 244a extends in a radial direction (i.e., O-X direction shown in FIG. 7) of the rotor core lamination 238. The pole body 244a has a central axis 245a (i.e., the O-X axis shown in FIG. 7) in the radial direction (i.e., O-X direction shown in FIG. 7). In other words, the pole body 244a is symmetrical about the central axis 245a. The pole shoe 250a extends radially outward from the pole body 244a. The pole shoe 250a has a pole shoe arc 252a. The pole shoe arc 252a is a portion of the outer edge of the pole shoe 250a. Specifically, the pole shoe arc 252a is a circular arc with a radius of R, and the pole shoe arc 252a has two endpoints 258a and 260a. The portions of the outer edge of the pole shoe 250a that are at two sides of the pole shoe arc 252a are pole shoe edges 262a and 264a, respectively. Each of the pole shoe edges 262a and 264a comprises a taper or has a radius of curvature smaller than that of the pole shoe arc 252a (i.e., R). Therefore, the air gap 290 shown in FIG. 3 between the rotor 230 and the stator 210 shown in FIG. 3 is graded. In other words, the air gaps 290 shown in FIG. 3 corresponding to the pole shoe edges 262a and 264a are larger than that corresponding to the pole shoe arc 252a. It should be noted that the air gap of a synchronous alternator may not be graded, as described above, in some embodiments.

The salient pole 242a and the salient pole 242b are asymmetrical about the line X-X' shown in FIG. 7. Specifically, the pole shoe 250a and the pole shoe 250b are asymmetrical about the line X-X' shown in FIG. 7. The central point 254a (i.e., the middle point between the endpoints 258a and 260a) of the pole shoe arc 252a is offset from the central axis 245a; the central point 254b (i.e., the middle point between the endpoints 258b and 260b) of the pole shoe arc 252b is offset from the central axis 245b. Specifically, the central point 254a of the pole shoe arc 252a is offset counterclockwise with respect to the central axis 245a toward the second salient pole 242b; the central point 254b of the pole shoe arc 252b is offset clockwise with respect to the central axis 245b toward the first salient pole 242a. In other words, offsets for the pole shoe arcs 252a and 252b are in opposite directions, i.e., clockwise and counterclockwise.

In one embodiment, the central point 254a of the pole shoe arc 252a is offset counterclockwise with respect to the central axis 245a by one quarter of the stator slot pitch (i.e., 0.25$T_{SSP}$) shown in FIG. 5; the central point 254b of the pole shoe arc 252b is offset clockwise with respect to the central axis 245b by one quarter of the stator slot pitch (i.e., 0.25$T_{SSP}$) shown in FIG. 5. In the example of FIG. 4 where the stator 210 has forty-eight stator slots 212, the line X-X' divides the rotor core lamination 238 into two halves equally, each of which corresponds to twenty-four stator slot pitches (i.e., 24 $T_{SSP}$). However, as a result of the offset of the central point 254a and the offset of the central point 254b, the central points 254a and 254b correspond to a minor arc with twenty-three and a half stator slot pitches (i.e., 23.5 $T_{SSP}$) and a major arc with twenty-four and a half stator slot pitches (i.e., 24.5 $T_{SSP}$), which will be further illustrated with reference to FIG. 8. In general, the angular displacements between the central points of the pole shoe arcs are (S/2−0.5)·$T_{SSP}$ and (S/2+0.5)·$T_{SSP}$.

Figure 8:
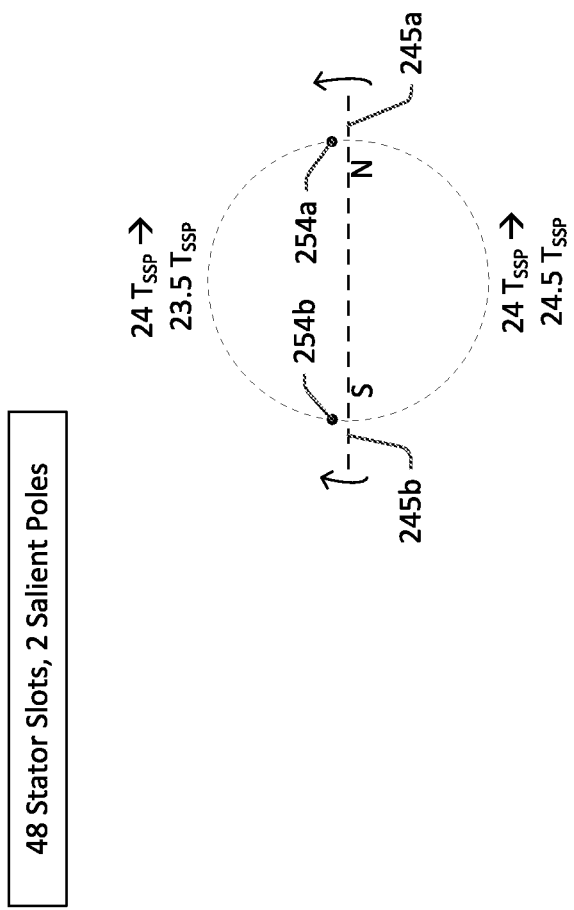
FIG. 8 is a schematic diagram illustrating the offset of central points of pole shoe arcs of FIG. 7.

FIG. 8 is a schematic diagram illustrating the offset of the central point 254a and the offset of the central point 254b of FIG. 7. In the example shown in FIG. 7 and FIG. 8, the stator not shown has forty-eight stator slots, and the rotor core lamination 238 has two salient poles 242a and 242b. As mentioned above, the central point 254a of the pole shoe arc 252a shown in FIG. 7 is offset counterclockwise with respect to the central axis 245a by one quarter of the stator slot pitch (i.e., 0.25$T_{SSP}$); the central point 254b of the pole shoe arc 252b is offset clockwise with respect to the central axis 245b by one quarter of the stator slot pitch (i.e., 0.25$T_{SSP}$). As a result, the central points 254a and 254b correspond to a minor arc with twenty-three and a half stator slot pitches (i.e., 23.5 $T_{SSP}$) and a major arc with twenty-four and a half stator slot pitches (i.e., 24.5 $T_{SSP}$). In other words, the offset of the central point 254a and the offset of the central point 254b collectively result in an angular displacement of a half stator slot pitch (i.e., 0.5 $T_{SSP}$). In general, the angular displacements between the central points of the pole shoe arcs are (S/2−0.5)·$T_{SSP}$ and (S/2+0.5)·$T_{SSP}$. The offset of the central points 254a and 254b of the pole shoe arcs 252a and 252b can improve the quality of output voltage waveform by reducing harmonic voltages, which will be described in detail below.

It should be noted that other offset amounts of the central point 254a with respect to the central axis 245a are within the scope of the disclosure, and other offset amounts of the central point 254b with respect to the central axis 245b are also within the scope of the disclosure. Amounts of stator slots other than forty-eight are also within the scope of this disclosure.

In some embodiments, the pole shoe 250a further includes multiple damper holes 256a for accommodating damper cage conductors not shown. The damper cage conductors are bars of electrically conducting, non-magnetic material such as copper or aluminum which pass through the rotor and are connected at each end. Currents induced in the damper cage conductors help to dampen out any irregularities which may occur during transient conditions or due to non-symmetrical loads. In one embodiment, the damper holes 256 are symmetrical about the central axis 245a of the pole body 244a, though the pole shoe arc 252a is asymmetrical about the central axis 245a. In another embodiment, the damper holes 256 are asymmetrical about the central axis 245a of the pole body 244a.

Figure 9:
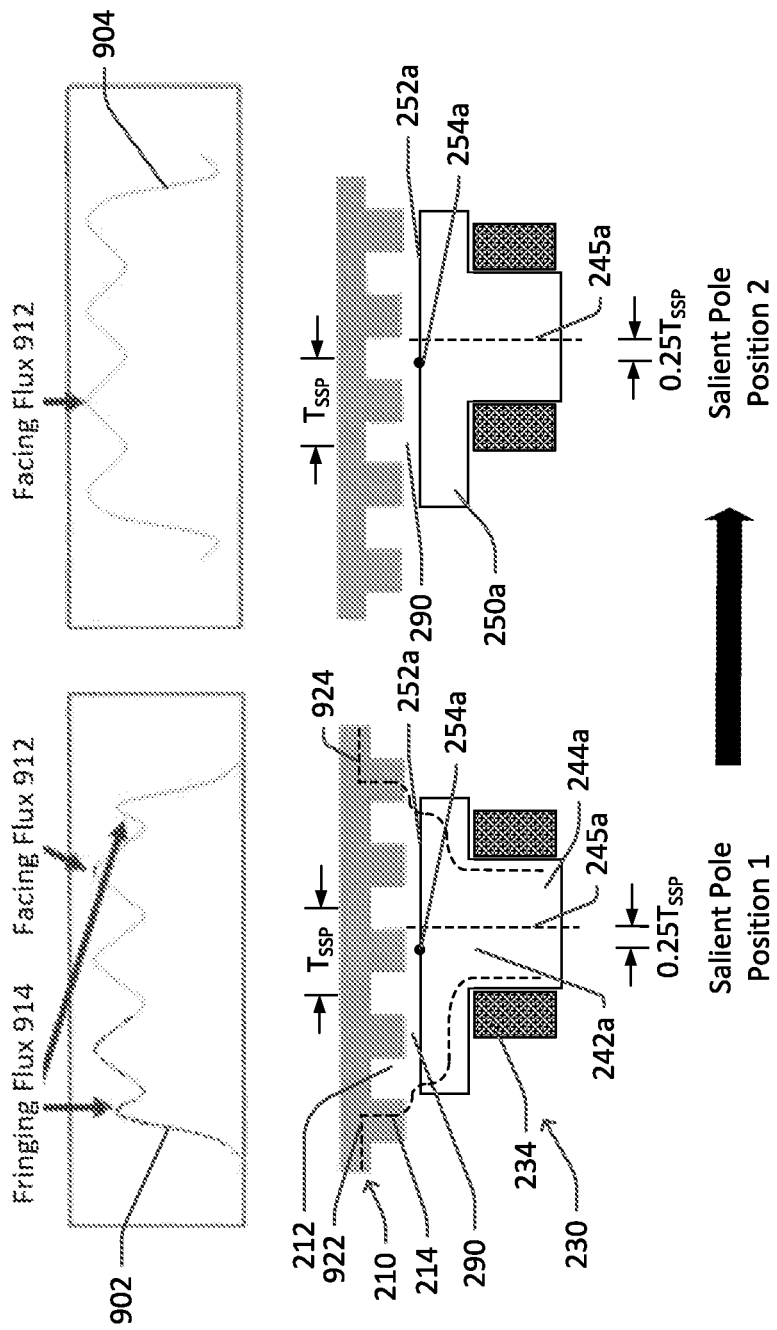
FIG. 9 is a schematic diagram illustrating the interaction between the stator of FIG. 3 and the rotor of FIG. 3.

FIG. 9 is a schematic diagram illustrating one example of the interaction between the stator 210 of FIG. 3 and the rotor 230 of FIG. 3. Harmonic voltages associated with stator slotting are related to the variations in the magnetic flux to flow across the air gap 290 between the stator 210 and the rotor 230 shown in FIG. 3. In general, two salient pole positions (i.e., the salient pole position 1 and the salient pole position 2) correspond to two different magnetic flux patterns (i.e., the magnetic flux pattern 902 and the magnetic flux pattern 904, respectively). Salient pole position 2 is half of a stator slot pitch in advance of salient pole position 1, in the direction of rotation. The stator 210 and the salient pole 242a of the rotor 230 are shown in the schematic for illustration. The magnetic flux in the air gap 290 assumes paths that enter (or leave) the stator 210 via stator teeth 214. Regions in the air gap 290 that are adjacent to stator teeth 214 therefore have higher magnetic flux densities than regions that are adjacent to stator slots 212, as shown in the magnetic flux patterns 902 and 904.

Specifically, in the salient pole position 1, the magnetic flux pattern 902 includes two components: the facing flux 912 and the fringing flux 914. The facing flux 912 is determined by the stator teeth 214 and the stator slots 212 opposite the pole shoe arc 252a, whereas the fringing flux 914 is determined by the stator teeth 214 beyond the span of the pole shoe arc 252a. The pole shoe arc 252a, in the salient pole position 1, faces three stator teeth 214 and four stator slots 212. Thus, the magnetic flux pattern 902 has three peaks that correspond to the three stator teeth 214 facing the pole shoe arc 252a. On the other hand, the stator teeth that are located beyond the span of the pole shoe arc 252a permit the magnetic flux to traverse the air gap 290 beyond the edges of the pole shoe arc 252a, as shown by the dash lines 922 and 924 on both sides of the pole shoe arc 252a. As such, the magnetic flux pattern 902 has two peaks that corresponds to the fringing flux 914.

Similarly, in the salient pole position 2, the pole shoe arc 252a faces four stator teeth 214 and three stator slots 212. Therefore, the magnetic flux pattern 904 has four peaks that correspond to the four stator teeth 214 facing the pole shoe arc 252a. On the other hand, fringing flux has its lowest magnitude in the salient pole position 2, as the closest stator teeth are distanced from the ends of the pole shoe arc 252a by the greatest possible amount ($0.5T_{SSP}$).

Therefore, the magnetic flux pattern varies as the salient pole 242a rotates with respect to the stator 210. The variation in the magnetic flux pattern is repeated each time the rotor 230 moves through a whole stator slot pitch (i.e., $T_{SSP}$). The fundamental frequency with which the magnetic flux pattern changes has the value of $S \cdot f_0$. A flux pulsation with frequency $S \cdot f_0$ is thus produced by the varying flux pattern.

The flux pulsation, with frequency $S \cdot f_o$, is stationary with respect to the rotor. It may be regarded as two travelling flux waves (moving in opposite directions) having the fundamental amount of poles and speed $S \cdot n_o$ relative to the rotor. One of these flux waves travels in the same direction as the rotor. It induces voltages in stator windings with frequency $(S+1) \cdot f_o$. The other flux wave travels in the opposite direction to the rotor. It induces voltages in stator windings with frequency $(S-1) \cdot f_o$.

It should be noted that FIG. 9 is schematic for demonstration, the same analysis applies to the other salient pole 242b of FIG. 7. It should also be noted that the magnetic flux pattern may be influenced by multiple factors such as the length of the pole shoe arc 252a, the ratio of stator slot opening width to stator slot pitch, average radial length of the air gap 290, whether or not the radial length of the air gap 290 is greater at the edges of the pole shoe 250a, and tapering of the pole shoe 250a toward edges.

In addition to the mechanism described above, harmonic voltages may be induced in stator windings by processes described below.

Travelling magnetic flux patterns, with S−1 and S+1 amounts of poles, may be established in the air gap of an alternator because of stator slotting. The travelling flux pattern with S−1 amounts of poles travels in the opposite direction to the rotor. It has speed $n_o/(S-1)$ relative to the stator. The travelling flux pattern with S+1 amounts of poles travels in the same direction as the rotor. It has speed $n_o/(S+1)$ relative to the stator. Each of these travelling magnetic flux patterns induces currents in rotor windings with frequency $S \cdot f_o$. In a non-limiting example, rotor windings are electrically conductive windings located on a rotor, including main field windings and windings formed by continuous electrical conducting paths in rotor cages.

The currents induced in rotor windings with frequency $S \cdot f_o$ create two travelling flux waves in the alternator air gap having the fundamental amount of poles and speed $S \cdot n_o$ relative to the rotor. One of these flux waves travels in the same direction as the rotor. It induces voltages in stator windings with frequency $(S+1) \cdot f_o$. The other flux wave travels in the opposite direction to the rotor. It induces voltages in stator windings with frequency $(S-1) \cdot f_o$. Thus, harmonic voltages with frequencies $(S+1) \cdot f_o$ and $(S-1) \cdot f_o$ are generated in the stator windings.

In practice, harmonic voltages with higher frequencies, $(k \cdot S+1) \cdot f_o$ and $(k \cdot S-1) \cdot f_o$, are also induced in stator windings. Harmonic voltages with several frequencies may therefore, be induced in the stator windings because of stator slotting.

Several techniques could be used for reducing harmonic voltages caused by stator slotting. One method is skewing of the stator core or the rotor core by one stator slot pitch (i.e., $T_{SSP}$). In a non-limiting example, a stator core is a steel core comprising stator core laminations. Skewing the stator core or the rotor core by one stator slot pitch may eliminate variation in permeability due to stator slotting over the stator/rotor core circumference.

However, automatic coil insertion equipment usually cannot place conductors in the slots of a skewed stator core. Therefore, skewing of the stator core must be performed after coil insertion. It is, therefore, not possible to make a skewed stator independent of coil insertion. Manufacturing flexibility may be diminished. Besides, when a stator coil that is inserted into a skewed and welded stator core is damaged, the stator coil and the stator core must be scrapped. The stator core cannot be used again because the insertion equipment is not compatible with skewed stator cores.

As to skewing of the rotor core, although it is possible to insert coils into a skewed rotor core using automated equipment, problems arise when designing plastic insulation for the slots of a skewed rotor core. These problems exist regardless of whether the rotor lamination stack is skewed prior to, or subsequent to coil insertion. Automatic insertion of wedges that are used to secure coils, is rendered difficult with a skewed rotor lamination core.

Harmonic voltages due to stator slotting are maximized when the amount of stator slots per pole pair (S) is an even integer. When the amount of stator slots per pole pair is not an even integer, harmonic voltages due to stator slotting may be minimized.

The maximum amount of parallel circuits that can be made in a stator winding is usually equal to the number of salient poles. When the number of stator slots per pole pair is not an even number however, the amount of parallel circuits that can be made is less than the maximum possible. Therefore, design flexibility is compromised when the amount of stator slots per pole pair is not an even integer.

Another method is offsetting damper cage conductors accommodated in damper holes 256a and 256b (collectively 256) as shown in FIG. 7. However, offsetting damper cage conductors results in a loss of diametrical symmetry on the rotor core lamination 238 as shown in FIG. 7. Specifically, the resultant loss of symmetry in the damper cage conductors makes it impossible to rotate one half of a rotor core 180° with respect to the other half when the number of poles is an odd multiple of two. Rotating one half of a rotor core through 180° is employed during rotor core building to minimize the effects of uneven thickness across multiple rotor core laminations. As such, offsetting damper cage conductors is not desirable for this reason.

Figure 10:
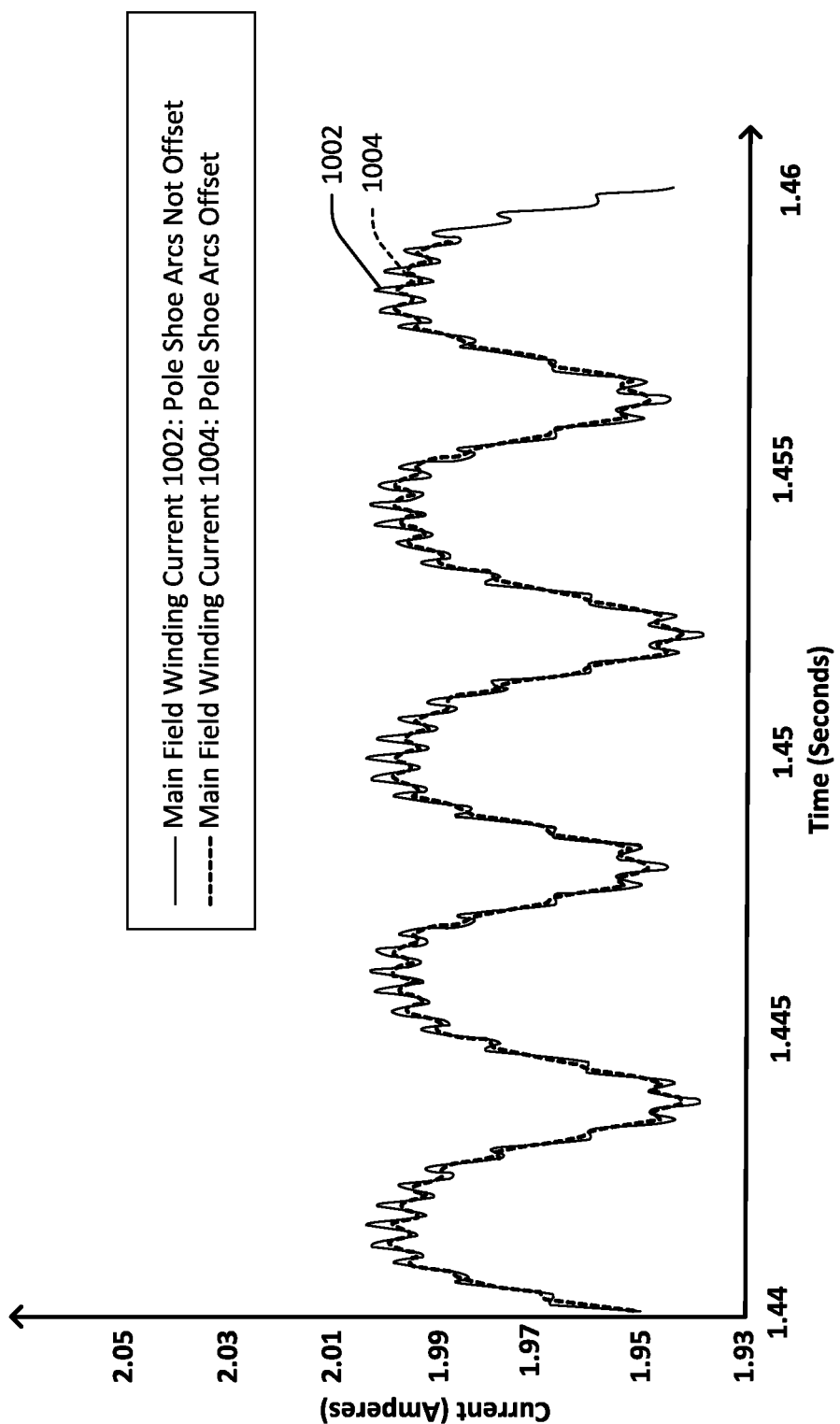
FIG. 10 is a diagram illustrating main field winding current of the synchronous alternator of FIG. 3 having the rotor core lamination of FIG. 7, and a synchronous alternator having rotor cores for which the pole shoes are not offset.
Figure 11:
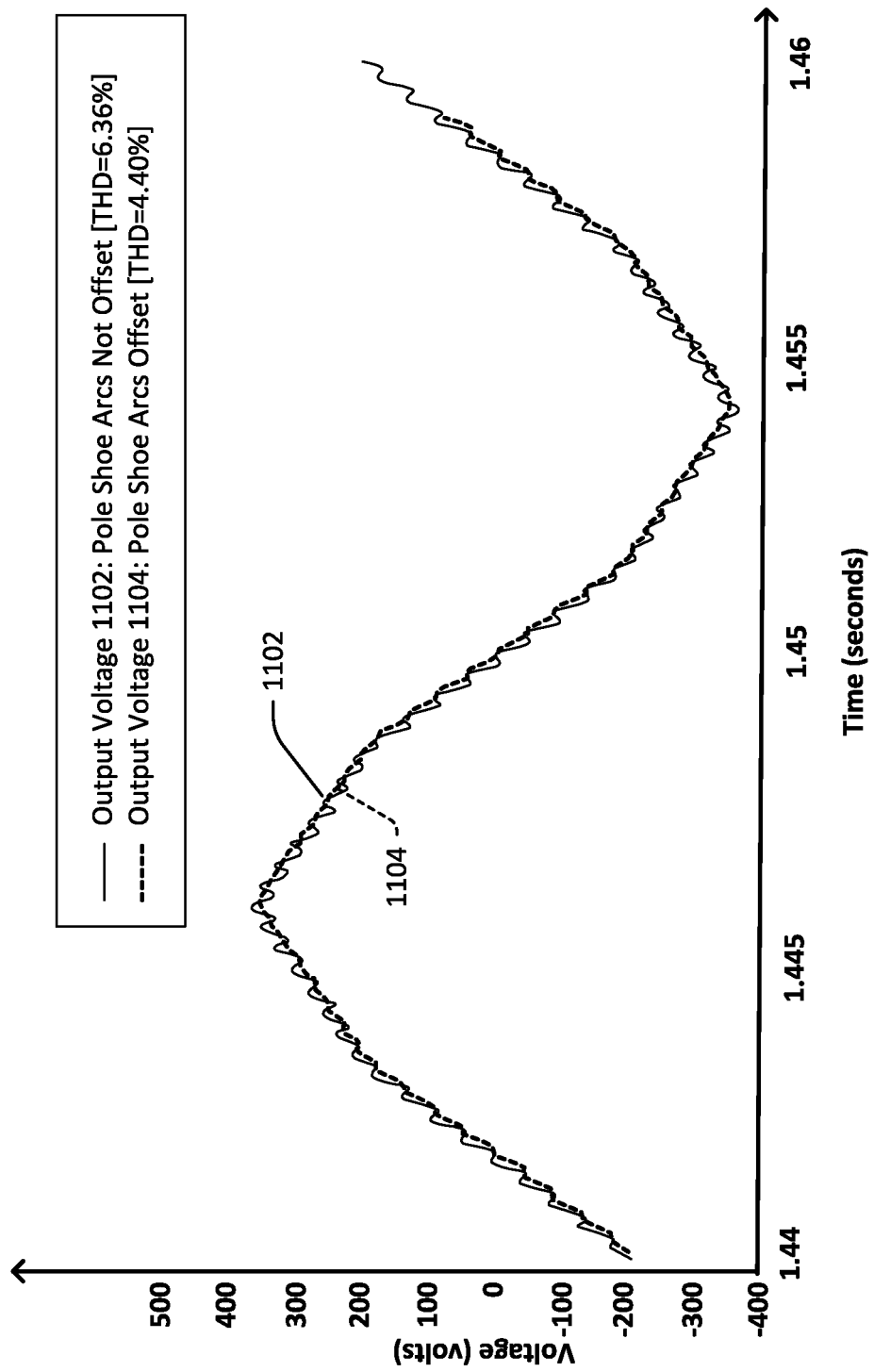
FIG. 11 is a diagram illustrating the output voltage of the synchronous alternator of FIG. 3 having the rotor core lamination of FIG. 7, and a synchronous alternator having rotor cores for which the pole shoes are not offset.

FIG. 10 is a diagram illustrating main field winding current of the synchronous alternator 200 of FIG. 3 having the rotor core lamination 238 of FIG. 7. FIG. 11 is a diagram illustrating an output voltage of the synchronous alternator 200 of FIG. 3 having the rotor core lamination 238 of FIG. 7. FIG. 10 and FIG. 11 are derived from finite element analysis (FEA), and both are simulated at the following conditions: no load, 240V, and 60 Hz. As shown in FIG. 10, the main field winding current 1004 is the main field winding current of the synchronous alternator 200 of FIG. 3 having the rotor core lamination 238 of FIG. 7. Specifically, the rotor core laminations are unskewed; and the central point 254a of the pole shoe arc 252a is offset counterclockwise with respect to the central axis 245a by one quarter of the stator slot pitch (i.e., $0.25T_{SSP}$), whereas the central point 254b of the pole shoe arc 252b is offset clockwise with respect to the central axis 245b by one quarter of the stator slot pitch (i.e., $0.25T_{SSP}$), as shown in FIG. 7. In comparison, the main field winding current 1002 is the main field winding current of a synchronous alternator having the same rotor core lamination profile except that the central points of the pole shoe arcs are not offset. As shown in FIG. 10, the main field winding current 1004 has less ripples than the main field winding current 1002 does.

As shown in FIG. 11, the output voltage 1104 is the output voltage of the synchronous alternator 200 of FIG. 3 having the rotor core lamination 238 of FIG. 7. Specifically, the rotor core laminations are unskewed; and the central point 254a of the pole shoe arc 252a is offset counterclockwise with respect to the central axis 245a by one quarter of the stator slot pitch (i.e., $0.25T_{SSP}$), whereas the central point 254b of the pole shoe arc 252b is offset clockwise with respect to the central axis 245b by one quarter of the stator slot pitch (i.e., $0.25T_{SSP}$), as shown in FIG. 7. In comparison, the output voltage 1102 is the output voltage of a synchronous alternator having the same rotor core lamination profile except that the central points of the pole shoe arcs are not offset. As shown in FIG. 11, the output voltage 1104 has less ripples than the output voltage 1102 does.

The conditions that produce the varying flux pattern illustrated in FIG. 9 are replicated in the air gap next to the adjacent salient pole. A cumulative effect, resulting in greatest variations of flux magnitude, is established when the amount of stator slots per pole pair is an even integer, and offsetting of pole shoes (described above) is not employed.

When the central points of the pole shoe arcs of adjacent poles are offset from their pole body central axes by angle $0.25T_{ssp}$ clockwise and counter clockwise respectively (as described in paragraph [0036]), the conditions in the air gaps next to adjacent salient poles, that produce the varying flux patterns illustrated in FIG. 9, negate each other when the amount of stator slots per pole pair is an even integer. Thus, variations in magnetic flux levels are minimized.

As noted above, it is often desirable for the amount of stator slots per pole pair to be an even integer. Offsetting of pole shoes allows for the amount of stator slots per pole pair to be an even integer, while providing a means for reducing stator slot harmonic voltages. Stator slot harmonic voltages are harmonic voltages induced in stator windings because of stator slotting.

In the rotor construction illustrated in FIG. 3, the laminations 238 have the same orientation for all axial positions over the stack length. As described above, when an alternator employs a rotor, constructed as shown in FIG. 3, reductions of stator slot harmonic voltages may be obtained.

Figure 13:
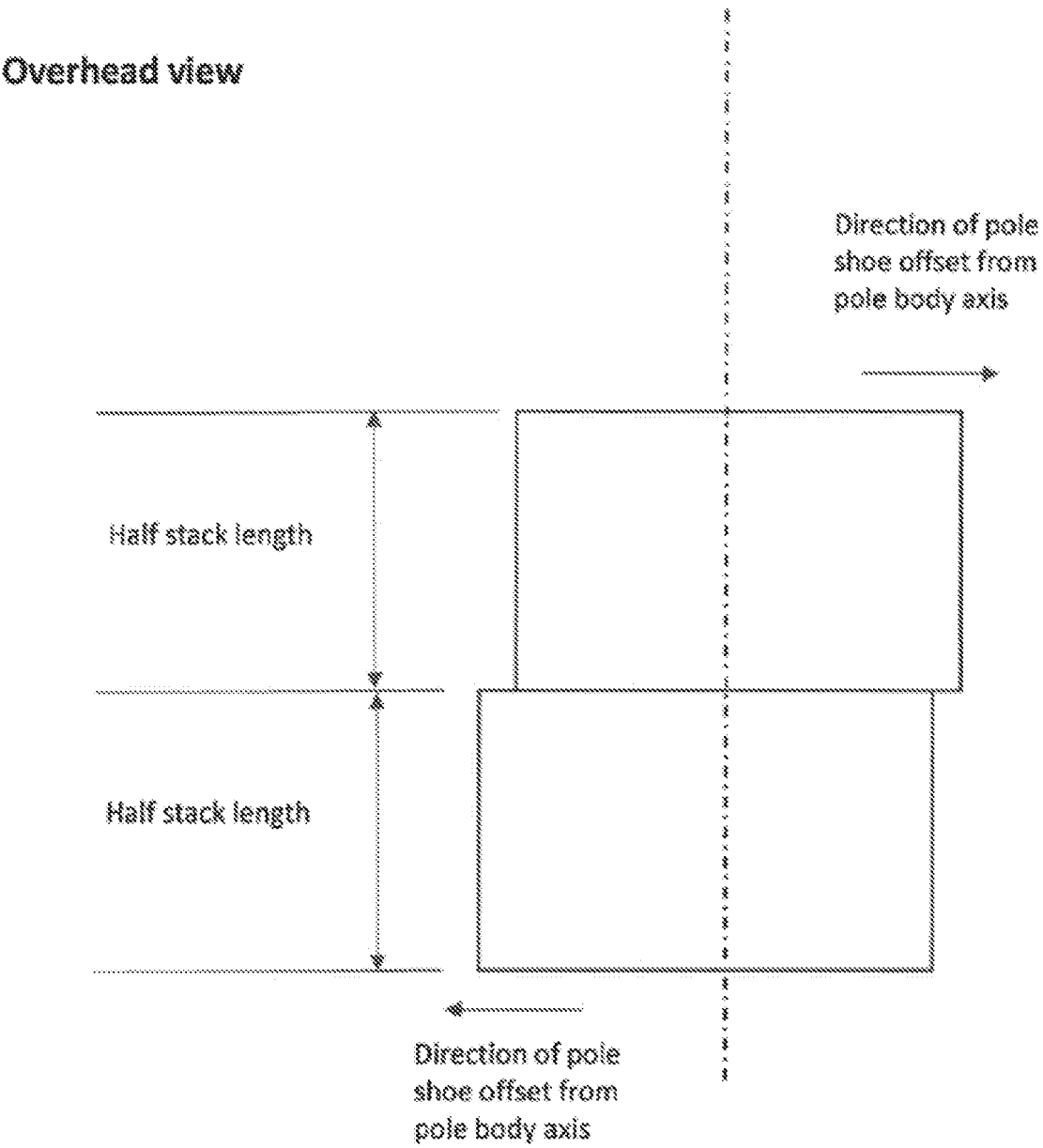
FIG. 13 is an overhead view of a rotor core employing the rotor core lamination of FIG. 7. The stack length is divided into halves in which the directions of pole shoe offset, from the pole body axis, are opposite.

Further reductions of stator slot harmonic voltages may be achieved by using a rotor with the construction indicated in FIG. 13. The rotor shown in FIG. 13 has all of the construction features of the rotor shown in FIG. 3. Additionally, the direction of pole shoe offset from the pole body axis differs for one half of the stack length, with respect to the other half of the stack length. In other words, the plurality of rotor core laminations include a first half stack and a second half stack, and the central point of the pole shoe arc in the first half stack and the corresponding central point of the pole shoe arc in the second half stack are offset in opposite directions, i.e., clockwise and counterclockwise. In order to achieve the differing pole shoe offset directions, each half of the stack length may be rotated 180° or aligned in the opposite axial direction, relative to the other half stack length.

In FIG. 13, the direction of pole shoe offset changes once over the stack length. In other embodiments, the direction of pole shoe offset may alter by greater amounts.

A synchronous alternator often must conform to certain standards, such as UL 2200, IEC 60034 and NEMA MG 1. Total harmonic distortion (THD) is among the various parameters specified by these standards. THD is a figure used to represent all harmonic voltages. It is usually expressed as a percentage of the fundamental value. Standards often require THD to be no greater than 5%. As shown in FIG. 11, the output voltage 1104 has a THD of 4.40% whereas the output voltage 1102 has a THD of 6.36%. In other words, employing the rotor core lamination 238 of FIG. 7 in the rotor 230 can reduce output voltage harmonics significantly from above 5% to below 5%.

In summary, in the design of the rotor core lamination 238 shown in FIG. 7, the central points 254a and 254b of the pole shoe arcs 252a and 252b are offset from the central axis 245a and the central axis 245b, respectively. As a result, output voltage harmonics due to stator slotting can be reduced. Skewing of the stator core is avoided, and therefore stator cores can be made independently of coil insertion. Manufacturing flexibility is thus increased. Dispensing with the skewing of stator cores can also lead to reductions in scrap material costs, because the stator core does not need to be scrapped when the stator coil is damaged if the stator core is unskewed. The plastic insulation design issue mentioned above can be avoided as the skewing of the rotor core is avoided. Symmetry of rotor cage between adjacent salient poles is maintained, as damper holes, and therefore damper cage conductors, do not have to be offset. This allows one half of a rotor core to be rotated 180° with respect to the other half. Mechanical imbalance of the rotor core lamination is also avoided, as damper holes, and therefore damper cage conductors, do not have to be offset. Moreover, since the amount of stator slots per pole pair may be an even number, the maximum amount of parallel circuits in the stator is allowed.

Figure 14:
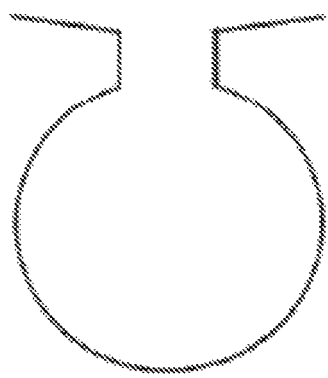
FIG. 14 is a diagram illustrating a damper rod hole with an opening to the pole shoe periphery.

Offsetting pole shoes as explained above, may be more effective for reducing stator slot harmonic voltages than offsetting damper cage conductors, in certain applications. Such applications include alternators in which rotor cages present high reactances to currents in their conductors. This condition may occur when damper holes do not include openings to the pole shoe periphery, as shown in FIG. 14.

When rotor cages are constructed using die-casting, damper holes usually cannot include openings to the pole shoe periphery. Offsetting of pole shoes may be used therefore, for reducing stator slot harmonic voltages, when the rotor cage is die casted.

As indicated above, further reductions in stator slot harmonic voltages are possible when the rotor is constructed as shown in FIG. 13.

Figure 12:
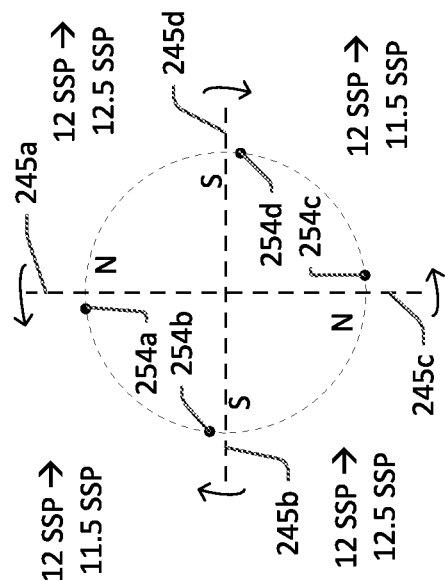
FIG. 12 is a schematic diagram illustrating offset of the central points of pole shoe arcs of a rotor core with four salient poles.

As mentioned above, the principles and design methodology shown above can be applied to rotor cores with more than two salient poles. FIG. 12 is a schematic diagram illustrating offset of the central points of pole shoe arcs of a rotor core with four salient poles. FIG. 12 is similar to FIG. 8, except that the rotor core in FIG. 12 has four salient poles. In the example shown in FIG. 12, the stator not shown has forty-eight stator slots, and the rotor core lamination not shown has four salient poles, which can be divided into two pairs. Each pair has one salient pole that may be considered a "north" pole and one salient pole that may be considered a "south" pole.

Within the first pair, the central point 254*a* of one pole shoe arc is offset counterclockwise with respect to the central axis 245*a* by one quarter of the stator slot pitch (i.e., 0.25$T_{SSP}$); the central point 254*b* of another pole shoe arc is offset clockwise with respect to the central axis 245*b* by one quarter of the stator slot pitch (i.e., 0.25$T_{SSP}$). As a result, the central points 254*a* and 254*b* correspond to a minor arc with eleven and a half stator slot pitches (i.e., 11.5 $T_{SSP}$). In other words, the offset of the central point 254*a* and the offset of the central point 254*b* collectively result in an angular displacement of a half stator slot pitch (i.e., 0.5 $T_{SSP}$).

Within the second pair, the central point 254*c* of one pole shoe arc is offset counterclockwise with respect to the central axis 245*c* by one quarter of the stator slot pitch (i.e., 0.25$T_{SSP}$); the central point 254*d* of another pole shoe arc is offset clockwise with respect to the central axis 245*d* by one quarter of the stator slot pitch (i.e., 0.25$T_{SSP}$). As a result, the central points 254*c* and 254*d* correspond to a minor arc with eleven and a half stator slot pitches (i.e., 11.5 $T_{SSP}$). In other words, the offset of the central point 254*c* and the offset of the central point 254*d* collectively result in an angular displacement of a half stator slot pitch (i.e., 0.5 $T_{SSP}$).

The offset of the central points 254*a*, 254*b*, 254*c*, and 254*d* can improve the quality of output voltage waveform by reducing harmonic voltages in the same manner as the offset of the central points 254*a* and 254*b* of FIG. 7 and FIG. 8. It should be noted that other numbers (e.g., six, eight, and the like) of salient poles are within the scope of the disclosure and the principles and design methodology are the same.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rotor core lamination comprising:
   a plurality of salient poles, each of the salient poles comprising:
      a pole body having a central axis in a radial direction of the rotor core lamination; and
      a pole shoe extending radially outward from the pole body, wherein the pole shoe has a pole shoe arc, and a central point of the pole shoe arc is offset from the central axis;
   wherein the rotor core lamination is arranged and configured to operate with a stator, the stator comprising a plurality of stator slots arranged to accommodate stator windings, wherein the plurality of salient poles includes a first salient pole and a second salient pole, the first salient pole being next to the second salient pole, and wherein the central point of the pole shoe arc of the first salient pole is offset with respect to the central axis of the first salient pole by one quarter of a stator slot pitch toward the second salient pole, and the central point of the pole shoe arc of the second salient pole is offset with respect to the central axis of the second salient pole by one quarter of the stator slot pitch toward the first salient pole.

2. The rotor core lamination of claim 1, wherein the pole shoe comprises a plurality of damper holes.

3. The rotor core lamination of claim 1, wherein the plurality of salient poles are two salient poles.

4. The rotor core lamination of claim 1, wherein the plurality of salient poles are four salient poles.

5. The rotor core lamination of claim 1, wherein the plurality of salient poles are more than four salient poles.

6. A rotor comprising:
   a lamination stack comprising a plurality of rotor core laminations, wherein the plurality of rotor core laminations are unskewed; and
   main field windings accommodated on the lamination stack;
   wherein each of the plurality of rotor core laminations comprises:
      a plurality of salient poles, each of the salient poles comprising:
         a pole body having a central axis in a radial direction of the rotor core lamination; and
         a pole shoe extending radially outward from the pole body, wherein the pole shoe has a pole shoe arc, and a central point of the pole shoe arc is offset from the central axis;
      wherein the plurality of salient poles include a first salient pole and a second salient pole, the first salient pole being next to the second salient pole, the central point of the pole shoe arc of the first salient pole being offset with respect to the central point of the pole shoe arc of the second salient pole, wherein the offset of the central point of the pole shoe arc of the first salient pole with respect to the central point of the pole shoe arc of the second salient pole results in an angular displacement of a half stator slot pitch.

7. The rotor of claim 6, wherein the pole shoe comprises a plurality of damper holes.

8. The rotor of claim 6, wherein the plurality of salient poles are two salient poles.

9. The rotor of claim 6, wherein the plurality of salient poles include four salient poles.

10. The rotor of claim 6, wherein the plurality of salient poles include more than four salient poles.

11. A synchronous electrical machine comprising:
    a stator comprising a plurality of stator slots arranged to accommodate stator windings;
    a rotor inside the stator, wherein the rotor comprises:
       a lamination stack comprising a plurality of rotor core laminations, wherein the plurality of rotor core laminations are unskewed; and main field windings accommodated on the lamination stack; and wherein each of the plurality of rotor core laminations comprises:

a plurality of salient poles, each of the salient poles comprising:

a pole body having a central axis in a radial direction of the rotor core lamination; and a pole shoe extending radially outward from the pole body, wherein the pole shoe has a pole shoe arc, and a central point of the pole shoe arc is offset from the central axis wherein the plurality of salient poles include a first salient pole and a second salient pole, the first salient pole being next to the second salient pole, and the central point of the pole shoe arc of the first salient pole being offset with respect to the central point of the pole shoe arc of the second salient pole, wherein the offset of the central point of the pole shoe arc of the first salient pole with respect to the central point of the pole shoe arc of the second salient pole results in an angular displacement of a half stator slot pitch.

12. The synchronous electrical machine of claim 11, wherein the amount of stator slots per pole pair is an even integer.

13. The synchronous electrical machine of claim 11, wherein the pole shoe comprises a plurality of damper holes.

14. The synchronous electrical machine of claim 11, wherein the plurality of rotor core laminations comprises a first half stack and a second half stack, and wherein the central point of the pole shoe arc in the first half stack and the central point of the pole shoe arc in the second half stack are offset in opposite directions.

* * * * *